United States Patent [19]

Ridley et al.

[11] Patent Number: 5,599,105
[45] Date of Patent: Feb. 4, 1997

[54] PURGE ASSEMBLY

[75] Inventors: Ian H. Ridley, Sheffield, England; Peter Fearnehough, Sheffield, United Kingdom

[73] Assignee: Land Instruments International Limited, Sheffield, England

[21] Appl. No.: 460,769

[22] Filed: Jun. 2, 1995

[30] Foreign Application Priority Data

Jun. 3, 1994 [GB] United Kingdom ............... 9411160

[51] Int. Cl.[6] ........................................... G01J 5/04
[52] U.S. Cl. ........................ 374/125; 374/208; 359/509
[58] Field of Search ................................. 374/125, 208; 359/509

[56] References Cited

U.S. PATENT DOCUMENTS

| | | | |
|---|---|---|---|
| 3,436,965 | 4/1969 | Land | 374/125 |
| 4,836,689 | 6/1989 | O'Brien et al. | 374/125 |
| 5,146,244 | 9/1992 | Myhre et al. | 374/125 |

FOREIGN PATENT DOCUMENTS

| | | |
|---|---|---|
| 1039955 | 8/1966 | United Kingdom . |
| WO8902069 | 3/1989 | WIPO . |

*Primary Examiner*—Christopher W. Fulton
*Attorney, Agent, or Firm*—Sterne, Kessler, Goldstein & Fox, P.L.L.C.

[57] ABSTRACT

A purge assembly for mounting to a radiation thermometer, comprises a purge tube for mounting in front of the radiation thermometer. At least two axially spaced chambers are positioned about the purge tube, each pair of chambers being linked by a respective restrictive opening such that a difference in pressure exists between adjacent chambers in use. An upstream chamber with respect to the flow of purge fluid is connected to source of purge fluid such as air in use and a downstream chamber with respect to the flow of purge fluid opens into the purge tube via a swirl reducing system whereby purge fluid is emitted into the purge tube in use. The chambers are positioned such that fluid flows through the chambers generally towards the lens and then through the downstream chamber opening towards an outer end of the purge tube away from the lens.

10 Claims, 1 Drawing Sheet

PURGE ASSEMBLY

FIELD OF THE INVENTION

The invention relates to a purge assembly for a radiation thermometer, for example an infrared thermometer.

DESCRIPTION OF THE PRIOR ART

In most cases, radiation thermometers are used under conditions where there is a significant risk that the lens of the thermometer will be obscured by dust and other contaminants. An example is monitoring the temperature of hot steel strip on a rolling mill. Conventionally, to deal with this, purge air is blown across the front of the lens to keep it clean. Typically, this is done by blowing air down a purge tube extending forward of the lens, thus stopping dust and other contaminants reaching the lens.

The problem with conventional designs is that typically air enters the purge tube at one position and undergoes "swirl". This results in a poor (non-uniform) velocity distribution in the purge tube and eddy flows inside the still tube (where provided). GB-A-1092590 illustrates an improvement in which the air is brought initially into a plenum chamber behind a diffuser ring. The ring is a porous material which allows air to pass but sets up back pressure which is equalised in the plenum chamber. This takes out the circumferential non-uniformities—i.e. one gets equal flow through each part of the diffuser, a uniform velocity distribution in the sight tube and reduced eddy flows in the still tube. This permits an effective purge of short overall length. The diffuser ring has typically been a sintered bronze disk or a plastic foam disk. Both suffer from blockage if they are used with dirty air for extended periods.

More recently, the diffuser ring has been replaced by a ring of "fins" or vanes which forms a similarly effective distributed partial obstruction of the annulus and is less prone to blockage. To get a good circumferential equalising, it is necessary either to have two rows of fins or to block a large fraction of the annulus in one row of fins. The former is preferred because it leads to less overall pressure drop in the unit for a given degree of circumferential equalisation.

The problems with these arrangements are that they require a considerable length in order to provide the plenum chambers of sufficient volume and it is particularly difficult in many practical applications.

SUMMARY OF THE INVENTION

In accordance with the present invention, a purge assembly for mounting to a radiation thermometer comprises an elongate purge tube for mounting in front of the radiation thermometer; and at least two axially spaced chambers positioned about the purge tube, the or each pair of chambers being linked by a respective restrictive opening such that a difference in pressure exists between adjacent chambers in use, an upstream chamber with respect to the flow of purge fluid being connected to a source of purge fluid in use and a downstream chamber with respect to the flow of purge fluid opening into the purge tube via a swirl reducing system whereby purge fluid is emitted into the purge tube in use, and wherein the chambers are positioned such that fluid flows through the chambers generally towards the lens and then through the downstream chamber opening towards an outer end of the purge tube away from the lens.

With this invention, a much more compact arrangement has been achieved which still enables two or more chambers to be used.

Typically, two chambers will be provided but for an increased pressure drop, three or more may be used, linked together in sequence between the upstream and downstream chambers. One or more restrictive openings may link each pair of chambers.

Preferably, the opening of the downstream chamber extends around the circumference of the purge tube whereby an annular shaped flow of purge air is obtained in use. The generation of an annular shaped flow is particularly helpful in preventing contamination of the lens although other forms of flow, for example individual jets spaced around the circumference, would also be possible.

Typically, the swirl reducing system comprises one or more vanes. Alternatively, diffusion rings could be used.

Conveniently, the swirl reducing system is positioned radially inwardly of the downstream chamber. This enables a very compact arrangement to be achieved although in other examples this swirl reducing system could be provided in a radially facing exit opening of the downstream chamber.

It is particularly convenient if the vanes of the swirl reducing system extend along at least half the length of the downstream chamber. This assists final straightening (i.e. swirl removal) of the air flow.

In some cases, the downstream chamber opening could be positioned adjacent the lens of the radiation thermometer. Typically, however, the downstream chamber opening is shielded from the lens by a still tube so as to define a still region in front of the lens. The still tube will have a length sufficient that eddy currents adjacent the lens due to fluid flow across the end of the still tube will be small. Most conveniently, in this case, the vanes of the swirl reducing system extend along at least half the length of the still tube.

It has been found particularly advantageous if the still tube tapers radially inwardly in a direction away from the lens and also has a sharp lip to further suppress eddy flows.

In general, the purge assembly will be detachable from the radiation thermometer to enable the assembly to be permanently mounted to a housing of the apparatus being monitored while the thermometer can be mounted and dismounted and/or replaced by another thermometer.

The invention is particularly suited for use with infrared thermometers but could also be used with other types of radiation thermometer of known construction.

BRIEF DESCRIPTION OF THE DRAWINGS

An example of an air purge assembly according to the invention will now be described with reference to the accompanying drawings, in which.

DETAILED DESCRIPTION OF THE EMBODIMENT

Figure 1:
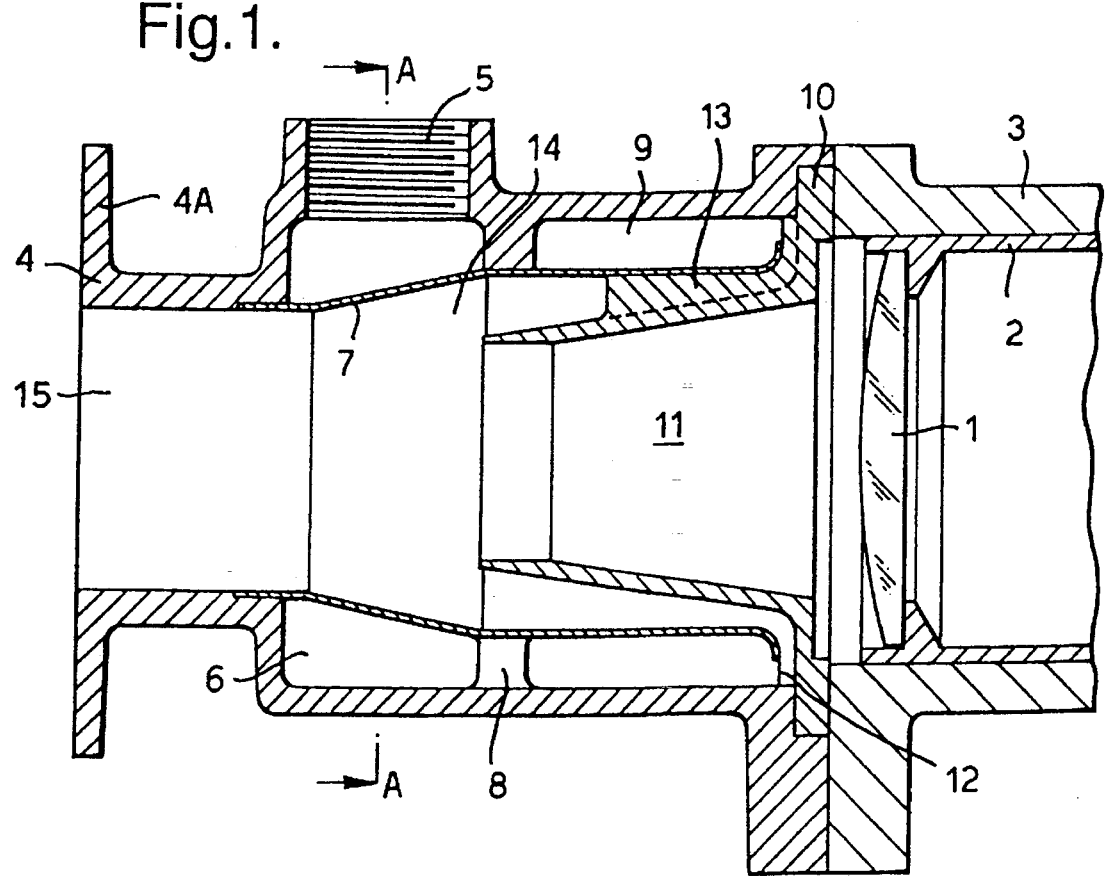
FIG. 1 is a longitudinal section through the assembly.

FIG. 1 illustrates the front end of an infrared thermometer including an objective lens 1 mounted to a housing 2 which is slidably mounted within an outer housing 3 in a conventional manner. The front of the housing 3 is secured to a purge tube 4 by means such as bolts (not shown). The purge tube 4 has a flange 4A by which it will be mounted to a housing of apparatus (not shown) containing the target to be monitored.

Figure 2:
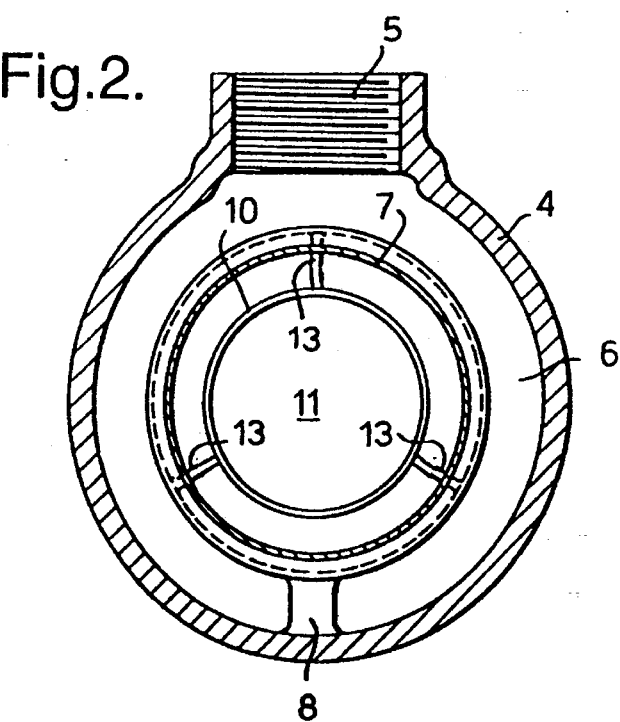
FIG. 2 is a section taken along the line A—A in FIG. 1.

The purge tube 4 defines a purge air inlet 5 connected to a source (not shown) of purge air in use, the inlet 5 opening into an upstream plenum chamber 6 extending circumferentially around an inner wall 7 of the purge tube 4 as shown in FIG. 2. The plenum chamber 6 communicates through a number of circumferentially spaced restricted openings 8 with a downstream chamber 9 also extending around the wall 7 of the purge tube 4. Typically, there will be in the order of twenty openings 8 but for clarity only one is shown in FIG. 2.

A radially inwardly tapering still tube 10 is positioned within the inner end of the purge tube 4 and defines a still region 11 adjacent the objective lens 1. Purge air passes out of the downstream chamber 9 through restricted openings 12 into a gap defined between the still tube 10 and the wall 7 of the purge tube 4. A swirl reducing system comprising a number (three in this example) of axially extending vanes 13 is provided in this region to prevent or reduce swirl (i.e. a tangential velocity component) of the purge air which is then emitted as an annular jet at an annular opening 14. The air then passes out through an exit opening 15 of the purge tube 4.

It will be noted that the vanes 13 extend more than halfway along the length of the plenum chamber 9 and the still tube 11. It has been found that the use of such long vanes assists final straightening (i.e. swirl removal) of the air flow.

Each restrictive opening 8,12 introduces a pressure drop and it has been found that two such sets of restrictions result in a lower total pressure drop than can be achieved with one, for the same effectiveness.

The still tube 10 is provided to reduce eddy current velocities at its inner end due to the flow of purge air at its outer end. It has also been found that tapering the still tube and providing the still tube with a sharp lip further suppresses eddy flows.

Typically, the jet velocity through the opening 14 is about 0.5 m/s with up to 5 m/s being possible.

In use, the purge tube 4 is mounted to a housing of apparatus containing the target to be monitored and the housing 3 is bolted to it. A radiation thermometer of conventional construction is then inserted into the tube 3 to enable the target temperature to be monitored.

We claim:

1. A purge assembly for mounting to a radiation thermometer, the assembly comprising an elongate purge tube for mounting in front of said radiation thermometer; and at least two axially spaced chambers positioned about said purge tube, said at least two chambers being linked by a respective restrictive opening such that a difference in pressure exists between adjacent chambers in use, an upstream chamber with respect to the flow of purge fluid being connected to a source of purge fluid in use and a downstream chamber with respect to the flow of purge fluid opening into the purge tube via a swirl reducing system whereby purge fluid is emitted into the purge tube in use, and wherein said chambers are positioned such that fluid flows through said chambers generally towards the lens and then through said downstream chamber opening towards an outer end of the purge tube away from the lens.

2. An assembly according to claim 1, wherein said opening of said downstream chamber extends around the circumference of said purge tube whereby an annular shaped flow of purge fluid is obtained in use.

3. An assembly according to claim 1, wherein said swirl reducing system comprises at least one vane.

4. An assembly according to claim 1, wherein said swirl reducing system is positioned radially inwardly of said downstream chamber.

5. An assembly according to claim 4, wherein said swirl reducing system comprises at least one vane, and wherein said vanes of said swirl reducing system extend along at least half the length of said downstream chamber.

6. An assembly according to claim 1, wherein said downstream chamber opening is shielded from said lens by a still tube so as to define a still region in front of the lens.

7. An assembly according to claim 6, wherein said still tube tapers radially inwardly in a direction away from the lens.

8. An assembly according to claim 6, wherein said swirl reducing system comprises at least one vane, and wherein said vanes of the swirl reducing system extend along at least half the length of said still tube.

9. A radiation thermometer coupled to a purge assembly comprising an elongate purge tube for mounting in front of said radiation thermometer; and at least two axially spaced chambers positioned about said purge tube, said at least two chambers being linked by a respective restrictive opening such that a difference in pressure exists between adjacent chambers in use, an upstream chamber with respect to the flow of purge fluid being connected to a source of purge fluid in use and a downstream chamber with respect to the flow of purge fluid opening into the purge tube via a swirl reducing system whereby purge fluid is emitted into the purge tube in use, and wherein said chambers are positioned such that fluid flows through said chambers generally towards the lens and then through said downstream chamber opening towards an outer end of the purge tube away from the lens.

10. A radiation thermometer according to claim 9, wherein said upstream chamber is connected to a source of air under pressure.

* * * * *